United States Patent

[11] 3,625,865

| [72] | Inventors | James R. Kittrell<br>El Cerrito;<br>Gordon E. Langlois, Lafayette; John W. Scott, Jr., Ross, all of Calif. |
|---|---|---|
| [21] | Appl. No. | 769,376 |
| [22] | Filed | Oct. 21, 1968 |
| [45] | Patented | Dec. 7, 1971 |
| [73] | Assignee | Chevron Research Company<br>San Francisco, Calif. |

[54] METHOD OF INCREASING HYDROCRACKING ACTIVITY AND/OR REDUCING HYDROCRACKING ACTIVITY DECLINE RATE OF CATALYST COMPRISING LAYERED CRYSTALLINE CLAY-TYPE ALUMINOSILICATE COMPONENT
9 Claims, No Drawings

| [52] | U.S. Cl. | 252/455 R |
|---|---|---|
| [51] | Int. Cl. | B01j 11/40 |
| [50] | Field of Search | 252/455 Z, 455 R |

[56] References Cited
UNITED STATES PATENTS

| 3,236,762 | 2/1966 | Rabo et al. | 208/111 |
|---|---|---|---|
| 3,252,757 | 5/1966 | Granquist | 23/111 |
| 3,407,148 | 10/1968 | Eastwood et al. | 252/455 |

Primary Examiner—Daniel E. Wyman
Assistant Examiner—C. F. Dees
Attorneys—A. L. Snow, F. E. Johnston, C. J. Tonkin and Roy H. Davies ABSTRACT: The method of treating a catalyst comprising a layered crystalline clay-type aluminosilicate component, to restore thereto at least a portion of the hydrocracking activity lost by dehydration, or to prevent dehydration-caused activity decline thereof during hydrocracking process operation, which comprises adding water to said catalyst.

METHOD OF INCREASING HYDROCRACKING ACTIVITY AND/OR REDUCING HYDROCRACKING ACTIVITY DECLINE RATE OF CATALYST COMPRISING LAYERED CRYSTALLINE CLAY-TYPE ALUMINOSILICATE COMPONENT

INTRODUCTION

This application relates to hydrocarbon conversion catalysts comprising layered crystalline clay-type aluminosilicate components and to methods of reducing the activity decline rate of said catalysts during use of said catalysts for hydrocracking.

PRIOR ART

It is known, particularly from Granquist U.S. Pat. No. 3,252,757, that a relatively new layered crystalline aluminosilicate clay-type mineral that has been synthesized has the empirical formula $$nSiO_2 : Al_2O_3 : mAB : xH_2O,$$

where the layer lattices comprise said said alumina, and said B, and where n is from 2.4 to 3.0
m is from 0.2 to 0.6
A is one equivalent of an exchangeable cation having a valence not greater than 2, and is external to the lattice,
B is chosen from the group of negative ions which consists of $F^-$, $OH^-$, $½O^{--}$ and mixtures thereof, and is internal in the lattice, and
x is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations.

Said layered synthetic clay-type crystalline aluminosilicate mineral (hereinafter included in the term "layered clay-type crystalline aluminosilicate" and in the term, used for brevity, "layered aluminosilicate," which terms are intended to include any other catalytically active layered clay-type crystalline aluminosilicate, whether synthetic or natural) is known from U.S. Pat. No. 3,252,889 to have application as a component of a catalytic cracking catalyst, and applications of said layered aluminosilicate in dried and calcined form as a component of a hydrocracking catalyst have been disclosed in the copending application of Sigmund M. Csicsery and Joseph Jaffe for "Hydrotreating Catalyst and Process," filed Aug. 14, 1968, Ser. No. 752,538 (now abandoned), in the copending application of Joseph Jaffe, Ser. No. 750,038, filed Aug. 5, 1968, now U.S. Pat. No. 3,535,229, and in the copending application of Sigmund M. Csicsery, Donald A. Hickson and Joseph Jaffe for "Catalyst Comprising Layered Crystalline Clay-Type Aluminosilicate Component, and Method of Activating Said Catalyst," filed Sept. 18, 1968, Ser. No. 760,619, now U.S. Pat. No. 3,535,228.

In said Csicsery, Hickson and Jaffe application filed Sept. 18, 1968, there is provided a method of activating a hydrocarbon conversion catalyst comprising a layered crystalline clay-type aluminosilicate component and a hydrogenating component, especially a hydrogenating component selected from rhenium and compounds thereof and Group VIII metals and compounds thereof, which comprises heating said catalyst, preferably in a stream of air or other oxygen-containing gas, at 900° to 1,150° F. for 0.5 to 20 hours. In said Csicsery, Hickson and Jaffe method, catalyst activation within the given temperature range-time range combination of conditions provides higher initial catalyst hydrocracking activity, and provides greater catalyst hydrocracking stability, than does catalyst activation at conditions outside the given combination. However, there remains incentive for further increasing hydrogenation activity and stability of a catalyst comprising a layered crystalline clay-type aluminosilicate, that is, for increasing the hydrocracking activity and for reducing the hydrocracking activity decline of the catalyst in hydrocracking service, even if previously it has been activated according to said Csicsery, Hickson and Jaffe method.

OBJECTS

In view of the foregoing, it is an object of the present invention to provide an improved method for increasing the hydrocracking activity and/or reducing the hydrocracking activity decline in hydrocracking service of a catalyst comprising a layered crystalline clay-type aluminosilicate component and at least one hydrogenating component.

STATEMENT OF INVENTION

It has been found that a catalyst comprising a layered crystalline clay-type aluminosilicate component and at least one hydrogenating component is subject to a hydrocracking activity loss caused by dehydration occurring either during catalyst activation or during use for hydrocracking, or both. Moreover, it has been found that: (1) if the catalyst is subjected during activation to temperatures in the range 900° to 1,150° F. for 0.5 to 20 hours, in accordance with said Csicsery, Hickson and Jaffe method, the hydrocracking activity loss caused by catalyst dehydration is more than offset by the activity increase caused by the elevated activation temperatures, and in addition the activity loss is reversible, that is, upon rehydration of the catalyst the lost activity is restored; (2) if the catalyst is subjected during activation to temperatures appreciably above the 1,150° F. upper limit of said Csicsery, Hickson and Jaffe method for 0.2 hours or more, the hydrocracking activity loss caused by catalyst dehydration often may not be offset by the activity increase caused by the elevated activation temperatures; (3) if the catalyst is subjected during activation to temperatures from 1,150° to 1,400° F. for 0.2 hours or more, the hydrocracking activity loss attributable to catalyst dehydration is to a substantial extent reversible; that is, upon rehydration of the catalyst at least an appreciable portion of the lost activity is restored; and (4) if the catalyst is subjected during activation to temperatures above 1,400° F. for 0.1 hour or more, the hydrocracking activity loss is substantially irreversible; that is, upon rehydration of the catalyst no appreciable portion of the lost activity is restored. In the latter case, it is apparent that irreversible structural collapse or other damage to the layered crystalline clay-type aluminosilicate component has been caused by the elevated activation temperature.

Accordingly, one embodiment of the method of the present invention is based on and directed to a finding that if the catalyst is subjected to a temperature during activation of 900° to 1,150° F. for 0.5 to 20 hours, in accordance with said Csicsery, Hickson and Jaffe method, or to a higher temperature, up to 1,400° F., 0.1 hour or more, preferably 0.1 to 10 hours, an appreciable portion of the catalyst hydrocracking activity lost because of catalyst dehydration can be restored by rehydrating the catalyst, preferably by adding to the reaction zone during the hydrocracking operation water or a compound convertible to water under the conditions of the hydrocracking reaction. Sufficient water is added to the catalyst after activation and prior to use for hydrocracking, or sufficient water or a compound convertible to water under the conditions of the hydrocracking reaction is added to the hydrocracking reaction zone after start of the hydrocracking reaction, to cause the hydrocracking activity of said catalyst to be greater, and preferably substantially greater, than in the absence of any water or water precursor compound addition. Preferably at least 0.005 ml., more preferably at least 0.01 ml., of water per gram of said layered crystalline clay-type aluminosilicate component will be caused to combine with the catalyst.

It also has been found that even though the addition of water or a water precursor compound has sufficiently rehydrated the catalyst to restore its hydrocracking activity lost because of dehydration, further dehydration can occur during process operation, under the conditions of the hydrocracking reaction, particularly because the reaction is conducted in the presence of large quantities of relatively dry hydrogen. This further dehydration can occur even at the low hydrocracking temperatures employed, and particularly over a long period of time can cause appreciable catalyst deactivation. Further in accordance with the present invention, it has been found that this deactivation, or hydrocracking activity decline caused by dehydration, can be prevented by adding water or a water precursor compound to the hydrocracking reaction zone during a substantial portion of the onstream period. This addition results in reducing the total hydrocracking activity decline rate of the catalyst during operation of the hydrocracking process. Preferably sufficient water or a water precursor compound is added to the reaction zone to cause the deactivation rate of the catalyst to be substantially less than the deactivation rate of said catalyst would be in the absence of such addition. The water or water compound addition is accomplished as discussed above in connection with rehydrating a dehydrated catalyst during process operation.

In accordance with the foregoing, the method of the present invention includes rehydration, in the indicated manner, of a catalyst comprising a layered crystalline clay-type aluminosilicate component and at least one hydrogenation component, to restore at least a portion of the catalyst hydrocracking activity lost as a result of catalyst dehydration during activation thereof, or during use thereof in a hydrocracking operation, or both. Also in accordance with the foregoing, the method of the present invention further includes reducing the activity decline rate, in the indicated manner, of a rehydrated catalyst being used in a hydrocracking operation.

In its broadest aspect, therefore, the method of the present invention is a treatment for activation, or prevention of deactivation, of a catalyst comprising a layered crystalline clay-type aluminosilicate catalyst, which comprises contacting said catalyst with water. The contacting can serve at least partially to rehydrate a catalyst that has become at least partially dehydrated during activation thereof or during use thereof in a hydrocracking operation, or both, to prevent a dehydration-caused activity decline during hydrocracking process operation.

In accordance with a particular embodiment of the present invention there is provided the method of treating a catalyst comprising a layered crystalline clay-type aluminosilicate component and a hydrogenating component, during use of said catalyst for hydrocracking a hydrocarbon feedstock in a hydrocracking zone under conventional hydrocracking conditions, which comprises contacting said catalyst with water by supplying to said hydrocracking zone during at least a substantial portion of each onstream period water or a compound convertible to water under the reaction conditions prevailing in said zone. As indicated elsewhere herein: (a) water as such may be added to the hydrocracking reaction zone; (b) a compound convertible to water under the conditions of the reaction zone, for example a paraffinic alcohol such as methanol, may be added to the reaction zone; (c) preferably sufficient water or water precursor compound is added to the reaction zone to cause the deactivation rate of the catalyst to be substantially less than in the absence of such addition; (d) advantageously water or water precursor compound is added to the reaction zone at a rate sufficient to cause at least 0.005 ml. of water per gram of layered synthetic clay-type aluminosilicate component to combine with the catalyst under the reaction conditions prevailing in the reaction zone and to remain combined therewith during at least a substantial portion of the onstream period; (e) preferably the catalyst comprises, in addition to said layered clay-type crystalline aluminosilicate component, at least one hydrogenating component selected from rhenium and compounds thereof, Group VIII metals and compounds thereof, and combinations of Group VI and Group VIII metals and compounds thereof; and (f) preferably said catalyst prior to being contacted with water has not been subjected to a temperature above 1,400° F.

WATER OR A COMPOUND THEREOF

Pursuant to the method of the present invention, the catalyst is contacted with water subsequent to activation thereof, either prior to or during the hydrocracking reaction. When the catalyst is contacted with water during the hydrocracking reaction, water as such, or a compound convertible to water under the hydrocracking reaction conditions prevailing in the hydrocracking zone, may be added to that zone. Any organic oxygen-containing compounds convertible to water under those conditions will be suitable and will be known to those skilled in the art. Generally, any organic oxygen-containing compound will be operable. Paraffinic alcohols, particularly lower alkanols such as methanol and ethanol, are preferred. Other suitable compounds include ketones, preferably acetone, ethers, and aldehydes.

HYDROCRACKING ZONE REACTION CONDITIONS

The hydrocracking zone containing a layered clay-type synthetic aluminosilicate and supplied with water or a water precursor compound in accordance with one embodiment of the present invention may be operated at a temperature of 400° to 900° F., a pressure of 1,000 to 3,500 p.s.i.g., a liquid hourly space velocity of 0.3 to 5.0, and a hydrogen supply rate of at least 500 SCF of hydrogen per barrel of hydrocarbon feedstock.

EXAMPLES

The following examples will serve to aid in further understanding the method of the present invention, but are not intended to limit the scope of the invention.

Example 1

A catalyst (catalyst A) consisting of rhenium and a layered synthetic crystalline aluminosilicate mineral for use in the process of the present invention was prepared in the following manner.

These starting materials were used:

1. 500 grams of a layered synthetic crystalline aluminosilicate mineral as described in Granquist U.S. Pat. No. 3,252,757;
2. 1,000 cc. of an aqueous solution of perrhenic acid (HReO$_4$), containing 10.8 grams of rhenium.

The mineral, in lumpy powder form, was introduced into a Hobart kitchen blender, followed by slow addition of the perrhenic acid solution while stirring, to form a pasty mass. The pasty mass was transferred to a dish and dried at 150° F. for approximately 16 hours. The resulting dried material was pressed through a 60-mesh screen to obtain fine granules. The granules were blended with a 1 percent Sterotex lubricant binder, and tabletted. The tablets were calcined in flowing air for 2 hours at 950° F. The tabletted, calcined rhenium-containing material was crushed, and a resulting 8–16 mesh fraction thereof was separated for use as a catalyst in the process of the present invention. This catalyst contained an amount of rhenium approaching the theoretical amount based on the amounts of ingredients used. This indicates that, although rhenium oxides normally are quite volatile, in this manner of preparation only a small amount of rhenium is lost during drying and calcination.

Example 2

A portion of the catalyst of example 1 was further calcined for 2 hours at 1,200° F., resulting in a catalyst (catalyst B) which is more dehydrated than catalyst A.

Example 3

A catalyst (catalyst C) consisting of nickel and a layered synthetic crystalline aluminosilicate mineral for use in the process of the present invention was prepared in the following manner.

These starting materials were used:

1. 500 grams of a layered synthetic crystalline aluminosilicate mineral as described in Granquist U.S. Pat. No. 3,252,757;

2. Approximately 1,000 cc. of an aqueous solution consisting of 150 grams of nickel nitrate in 880 cc. water.

The mineral, in lumpy powder form, was introduced into a Hobart kitchen blender, followed by slow addition of the perrhenic acid solution while stirring, to form a pasty mass. The pasty mass was transferred to a dish and dried at 250 F. for approximately 16 hours. The resulting dried material was pressed through a screen to obtain fine granules. The granules were blended with a 1 percent Sterotex lubricant binder, and tabletted. The tablets were calcined in flowing air for 2 hours at 1,275° F. The tabletted, calcined material was crushed, and a resulting 8–16 mesh fraction thereof was separated for use as a catalyst in the process of the present invention. This catalyst contained an amount of nickel approaching the theoretical amount based on the amounts of ingredients used.

Example 4

A 33.7 mg. sample of the layered, clay-type crystalline aluminosilicate of example 1 was tested for activity for isomerization and cracking of 3-methylheptane at an operating temperature of 450° F. The catalyst sample was flushed with nitrogen at room temperature, then preheated in flowing dry hydrogen at 450° F. for 1 hour, and then used to isomerize and crack 3-methylheptane at 450° F. Two weight percent of the feed was converted to other compounds. The catalyst sample then was preheated in flowing dry hydrogen at 900° F. for 1 hour, and then again used to isomerize and crack 3-methylheptane at 450° F. Nine weight percent of the feed was converted to other compounds. The catalyst sample then was preheated in flowing dry hydrogen at 1,500° F. for 1 hour, and then again used to isomerize and crack 3-methylheptane at 450° F. Four weight percent of the feed was converted to other compounds.

In summary:

| Catalyst Preheating Temperature | Weight percent conversion 3-methylheptane feed to other compounds |
| --- | --- |
| 450 | 2 |
| 900 | 9 |
| 1,500 | 4 |

The foregoing indicates that preheating of the catalyst to 1,500° F. caused a degeneration in catalyst activity. In an effort to restore some of the lost activity, the catalyst sample was rehydrated by adding about 16 microliters of water to the sample, after which the sample again was used to isomerize and crack 3-methylheptane. Four weight percent of the feed was converted to other compounds, indicating that the rehydration did not restore activity lost by heating the sample to 1,500° F.

Example 5

Catalyst B of example 2 was used to hydrocrack a portion of a light cycle oil (LCO) feedstock of the following description:

| | |
| --- | --- |
| Gravity, °API | 30.1 |
| Aniline point, °F. | 130.8 |
| Sulfur, p.p.m. | 6 |
| Nitrogen, p.p.m. | 0.7 |
| Aromatics content, LV% | 21 |
| Distillation, ASTM D-1160 | |
| ST/5 | 418/448 |
| 10/30 | 461/481 |
| 50 | 520 |
| 70/90 | 569/641 |
| 95/EP | 669/723 |

The hydrocracking was accomplished on a once-through basis at a pressure of 1,200 p.s.i.g., an LHSV of 1.5, and a hydrogen supply rate of 5,600 SCF/B. Product gravities were used to indicate degree of conversion achieved.

Another portion of the same LCO was combined with 0.5% $CH_3OH$ and hydrocracked at the same conditions.

The following are the results for each case:

| | Catalyst Temperature, °F. | Product Gravity, °API |
| --- | --- | --- |
| LCO feed | 643 | 44 |
| LCO feed with added $CH_3OH$ | 609 | 44 |

It may be seen that the presence of the alcohol increased the catalyst activity by about 35° F.

Example 6

Catalyst A of example 1 was used to hydrocrack additional portions of the two feedstocks of example 5 (the LCO and the LCO with added $CH_3OH$). The processing conditions were the same as in example 5, except that a recycle hydrogen rate of 5,600 SCF/B. was used and all reactor effluent boiling above 400° F. was recycled to extinction. Catalyst temperatures were adjusted to maintain 60 percent per-pass conversion. The catalyst temperatures, after 617 hours on stream, required to maintain said conversion were:

| | Catalyst Temperature, °F. |
| --- | --- |
| LCO feed | 646 |
| LCO feed with added $CH_3OH$ | 625 |

Example 7

Catalyst C of example 3 was used to hydrocrack additional portions of the two feedstocks of example 5. The processing conditions were the same as in example 6, except rapid catalyst deactivation prevented strict maintenance of per-pass conversion at any target level. Therefore, the per-pass conversions achieved, after 320 hours on stream, at approximately 640° F., were compared and are as follows:

| | Per-pass conversion achieved |
| --- | --- |
| LCO feed | 30* |
| LCO feed with added $CH_3OH$ | 40 |

*extrapolated from data obtained when the catalyst had been on stream for 280 to 310 hours.

THEORY OF METHOD OF PRESENT INVENTION

Although applicants do not intend to be bound by any theory explaining the beneficial effects of the method of the present invention, it is believed that the following, largely theoretical explanation, when read in connection with the above examples, is accurate and aids in understanding the use, and effects of the use, of said method.

As the temperature of a layered clay-type crystalline aluminosilicate is increased in the presence of a stream of dry $H_2$, the hydrocracking activity of the aluminosilicate gradually increases as the temperature approaches 900°–1,000° F. Infrared spectra suggest that this is due to the removal of $NH_3$ from the acid sites. At temperatures greater than 1,000° F., the activity of the aluminosilicate begins to decline. At temperatures in the range of 1,000°–1,300° F. this loss of activity may be attributable to a loss of water (either adsorbed or combined) from the aluminosilicate surface; therefore, a conversion of active Brönsted sites to inactive Lewis sites occurs. Because this conversion is at least partially reversible, the Brönsted activity may be regained by rehydrating the surface (e.g., by addition of water or ethanol to the feed). It is probable, then, that an exceedingly minor amount of water when added to such a dehydrated catalyst will cause at least some, though minor, increase in hydrocracking activity. Also, there will be some maximum amount of water required for complete activation; the amount will vary, depending upon the extent of dehydration of the catalyst. In a flow system, the amount of water added to the feed (and hence the water partial pressure at the catalyst surface) must depend upon the settings of the process variables, including temperature and pressure, used in the reactor. As would be expected, the examples show that a more completely dehydrated catalyst has more of its activity restored with a given amount of water than a less severely dehydrated catalyst.

At temperatures greater than about 1,000° F., at least some irreversible structural collapse of the layered clay-type crystalline aluminosilicate occurs simultaneously with dehydration. At temperatures greater than about 1,400° F., this irreversible damage becomes so great that upon rehydration the catalyst does not regain appreciable hydrocracking activity, as indicated by example 4, which shows that hydrocracking activity is not improved by rehydrating a catalyst that previously had been subjected to a temperature of 1,500° F.

Although only specific embodiments of the present invention have been described, numerous variations can be made in these embodiments without departing from the spirit of the invention, and all such variations that fall within the scope of the appended claims are intended to be embraced thereby.

What is claimed is:

1. The method of treating a hydrocracking catalyst comprising a layered synthetic crystalline clay-type aluminosilicate component and a hydrogenating component, to restore thereto at least a portion of the hydrocracking activity lost by dehydration, or to prevent dehydration-caused activity decline thereof during hydrocracking process operation, which comprises adding water to said catalyst, said hydrogenating component being selected from rhenium and compounds thereof, Group VIII metals and compounds thereof, and combinations of Group VI and Group VIII metals and compounds thereof.

2. The method as in claim 1, wherein said catalyst has not been subjected to a temperature above 1,400° F. before being used for hydrocracking.

3. The method of treating a catalyst comprising a layered synthetic crystalline clay-type aluminosilicate component and a hydrogenating component, during use of said catalyst for hydrocracking a hydrocarbon feedstock in a hydrocracking zone under conventional hydrocracking conditions, which comprises contacting said catalyst with water by supplying to said hydrocracking zone during at least a substantial portion of each onstream period water or an organic oxygen-containing compound convertible to water under the reaction conditions prevailing in said zone.

4. The method as in claim 3, wherein a paraffinic alcohol is supplied to said zone as a compound convertible to water under said conditions.

5. The method as in claim 3, wherein water is supplied to said zone.

6. The method as in claim 3, wherein sufficient water or a compound convertible to water is supplied to said hydrocracking zone to cause the deactivation rate of said catalyst to be substantially less than the deactivation rate of said catalyst would be in the absence of a supply to said reaction zone of water or a compound convertible to water.

7. The method as in claim 3, wherein water or a compound convertible to water is supplied to said hydrocracking zone at a rate sufficient to cause at least 0.005 ml. of water per gram of said layered crystalline clay-type aluminosilicate component to combine with said catalyst under said reaction conditions and to remain combined therewith during at least said substantial portion of said onstream period.

8. The method as in claim 3 wherein said catalyst comprises a hydrogenating component selected from rhenium and compounds thereof, Group VIII metals and compounds thereof, and combinations of Group VI and Group VIII metals and compounds thereof.

9. The method as in claim 3 wherein said catalyst has not been subjected to a temperature above 1,400° F. before being used for hydrocracking.

* * * * *

PO-1050
(5/69)

UNITED STATES PATENT OFFICE
CERTIFICATE OF CORRECTION

Patent No. 3,625,865                    Dated December 7, 1971

Inventor(s) JAMES R. KITTRELL, GORDON E. LANGLOIS, JOHN W. SCOTT, JR.

It is certified that error appears in the above-identified patent and that said Letters Patent are hereby corrected as shown below:

Column 1, line 20, "said said alumina" should read --said silica, said alumina--

Column 1, line 54, "U.S. Pat. No. 3,535,229" should read --U.S. Pat. No. 3,535,233--

Column 7, lines 31-34, "from rhenium and compounds thereof, Group VIII metals and compounds thereof, and combinations of Group VI and Group VIII metals and compounds thereof." should read --from components comprising rhenium and components comprising Group VIII metals.--

Column 8, lines 31-33, "from rhenium and compounds thereof, Group VIII metals and compounds thereof, and combinations of Group VI and Group VIII metals and combinations thereof." should read --from components comprising rhenium and components comprising Group VIII metals.--

Signed and sealed this 13th day of November 1973.

(SEAL)
Attest:

EDWARD M. FLETCHER, JR.                RENE D. TEGTMEYER
Attesting Officer                       Acting Commissioner of Patents